(12) United States Patent
Maltz

(10) Patent No.: US 9,557,812 B2
(45) Date of Patent: *Jan. 31, 2017

(54) EYE GAZE USER INTERFACE AND CALIBRATION METHOD

(71) Applicant: Gregory A. Maltz, Castro Valley, CA (US)

(72) Inventor: Gregory A. Maltz, Castro Valley, CA (US)

(*) Notice: Subject to any disclaimer, the term of this patent is extended or adjusted under 35 U.S.C. 154(b) by 336 days.

This patent is subject to a terminal disclaimer.

(21) Appl. No.: 14/066,654

(22) Filed: Oct. 29, 2013

(65) Prior Publication Data

US 2014/0049452 A1 Feb. 20, 2014

Related U.S. Application Data

(63) Continuation-in-part of application No. 13/117,146, filed on May 27, 2011, now Pat. No. 8,593,375, which is a continuation-in-part of application No. 12/842,315, filed on Jul. 23, 2010, now Pat. No. 8,531,355, and a continuation of application No. 13/034,182, filed on Feb. 24, 2011, now Pat. No. 8,531,394.

(51) Int. Cl.
*G06F 3/01* (2006.01)
*G06F 3/0484* (2013.01)
*G02B 27/01* (2006.01)

(52) U.S. Cl.
CPC ............ *G06F 3/013* (2013.01); *G02B 27/017* (2013.01); *G06F 3/04842* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ... G06F 3/013; G02B 27/017; G02B 27/0178; G02B 2027/014; G02B 2027/0187; G02B 2027/0138
See application file for complete search history.

(56) References Cited

U.S. PATENT DOCUMENTS 4,950,069 A * 8/1990 Hutchinson .................. 351/210
5,583,795 A * 12/1996 Smyth .................. A61B 3/0025
359/630

(Continued)

*Primary Examiner* — Ilana Spar
*Assistant Examiner* — Mihir K Rayan
(74) *Attorney, Agent, or Firm* — Stephen E. Zweig

(57) ABSTRACT

A software controlled user interface and calibration method for an eye gaze controlled device, designed to accommodate angular accuracy versus time averaging tradeoffs for eye gaze direction sensors. The method can scale between displaying a small to large number of different eye gaze target symbols at any given time, yet still transmit a large array of different symbols to outside devices with minimal user training. At least part of the method may be implemented by way of a virtual window onto the surface of a virtual cylinder, with eye gaze sensitive symbols that can be rotated by eye gaze thus bringing various groups of symbols into view, and then selected by continual gazing. Specific examples of use of this interface and method on an eyeglasses-like head-mountable, vision-controlled, device are disclosed, along with various operation examples including sending and receiving text messages, control of robotic devices and control of remote vehicles.

17 Claims, 11 Drawing Sheets

(56) References Cited

U.S. PATENT DOCUMENTS

| | | | | |
|---|---|---|---|---|
| 5,651,107 A * | 7/1997 | Frank et al. | | 715/768 |
| 5,844,544 A * | 12/1998 | Kahn | | G06F 3/0236 |
| | | | | 345/156 |
| 5,880,733 A * | 3/1999 | Horvitz | | G06F 3/04815 |
| | | | | 345/427 |
| 6,031,531 A * | 2/2000 | Kimble | | G06F 3/04812 |
| | | | | 340/4.1 |
| 6,045,229 A * | 4/2000 | Tachi et al. | | 353/28 |
| 6,323,884 B1 * | 11/2001 | Bird | | G06F 3/04812 |
| | | | | 715/810 |
| 6,456,262 B1 * | 9/2002 | Bell | | A61B 3/113 |
| | | | | 345/472 |
| 7,013,258 B1 * | 3/2006 | Su | | G06F 3/013 |
| | | | | 345/171 |
| 8,531,355 B2 * | 9/2013 | Maltz | | H04W 4/20 |
| | | | | 345/8 |
| 8,531,394 B2 * | 9/2013 | Maltz | | G02B 7/287 |
| | | | | 345/156 |
| 8,593,375 B2 * | 11/2013 | Maltz | | G06F 3/013 |
| | | | | 345/8 |
| 2004/0155907 A1 * | 8/2004 | Yamaguchi | | G06F 3/0481 |
| | | | | 715/810 |
| 2005/0225723 A1 * | 10/2005 | Pilu | | A61B 3/113 |
| | | | | 351/209 |
| 2006/0061544 A1 * | 3/2006 | Min et al. | | 345/156 |
| 2006/0103591 A1 * | 5/2006 | Tanimura et al. | | 345/8 |
| 2007/0164990 A1 * | 7/2007 | Bjorklund | | G06F 3/017 |
| | | | | 345/156 |
| 2008/0134086 A1 * | 6/2008 | Liao | | G06F 3/0482 |
| | | | | 715/810 |
| 2008/0174570 A1 * | 7/2008 | Jobs | | G06F 3/0488 |
| | | | | 345/173 |
| 2009/0176532 A1 * | 7/2009 | Chae et al. | | 455/566 |
| 2011/0205162 A1 * | 8/2011 | Waller | | B60K 35/00 |
| | | | | 345/173 |
| 2014/0129987 A1 * | 5/2014 | Feit | | G06F 3/04842 |
| | | | | 715/835 |

* cited by examiner

EYE GAZE USER INTERFACE AND CALIBRATION METHOD

This application is a continuation in part of U.S. patent application Ser. No. 13/117,146 entitled "EYE GAZE USER INTERFACE AND METHOD", inventor Gregory A Maltz, filed May 27, 2011; application Ser. No. 13/117,146 in turn was a continuation in part of U.S. patent application Ser. No. 12/842,315, "Unitized, Vision-Controlled, Wireless Eyeglass Transceiver", filed Jul. 23, 2010, Inventor Gregory A Maltz, now U.S. Pat. No. 8,531,355; Ser. No. 13/117,146 was also a continuation in part of U.S. patent application Ser. No. 13/034,182, "Unitized, Vision-Controlled, Wireless Eyeglasses Transceiver", filed Feb. 24, 2011, Inventor Gregory A. Maltz, now U.S. Pat. No. 8,531,394; the contents of all these disclosures are incorporated herein by reference.

BACKGROUND OF THE INVENTION

Field of the Invention

The invention is in the field of user interfaces for eye tracking devices, particularly as applied to the control of wireless communication and other devices.

Description of the Related Art

As cellular telephones and other mobile devices have proliferated, so has the expectation that individuals will always have the option to instantly communicate with their contacts. Thus in both business and in private matters, when an individual is not able to instantly respond to at least text messages, this expectation goes unmet, and social friction and/or lost business opportunities can result. Although cell phone and text communications are often infeasible during certain times of the day, the perception remains that the only reason why the recipient of a message may not have responded is due to a deliberate desire of the recipient to ignore the message.

However the act of turning on a cell phone, scrolling through incoming text messages, and then responding to the text messages can be obtrusive, conspicuous and in some situations inappropriate. Thus there are many times when it is inadvisable or socially awkward to break off a conversation to respond to an incoming cellular phone text message. Indeed, an important client or loved one may be insulted if this occurs. Thus at present, a cell phone user is faced with the difficult problem of trying to balance priority between the environment e.g., a person they are talking to face to face, versus the person who is trying to contact them.

A similar problem can often be encountered by a disabled person who may wish, for example, to remotely control an assistive device while, at the same time, not struggle with or draw attention to the disability. Likewise, military personnel may need to discreetly control a bomb-diffusing robot, drone plane or other remote vehicle. In these examples, the user may not be able to use his or her hands, and wishes to appear as outwardly normal as possible. Thus, methods to allow an inconspicuous eye control device to manage various remote functions are of great importance. Indeed, there are many situations in life where non-disabled and non-military persons may also wish to inconspicuously eye control various types of devices as well, including using an embodiment of the eye gaze interface to operate functions of a motor vehicle, robotic arm and hands-free camera.

BRIEF SUMMARY OF THE INVENTION

In one embodiment, the invention may be a software controlled user interface and method for an eye gaze controlled device, designed to accommodate angular accuracy versus time averaging tradeoffs for eye gaze direction sensors. The method is simple, intuitive, and can scale between displaying a small to large number of different eye gaze target symbols at any given time, yet still transmit a large array of different symbols to outside devices with minimal user training At least part of the method may be implemented by way of a virtual window onto the surface of a virtual cylinder, with eye gaze sensitive symbols that can be rotated by eye gaze to bring various groups of symbols into view, and then selected by continual gazing. Specific examples of use of this interface and method on an eyeglasses-like head-mountable, vision-controlled, device are disclosed, along with various operation examples including sending and receiving text messages and control of robotic devices.

The method will generally use at least one eye position tracking sensor to determine when the user's eye or eyes are on average gazing in a direction that is within the eye position zone of at least one of these plurality of visible elements for a time period exceeding a hovering time interval. The method will keep track of this gaze duration, and signal the user when a first hovering time interval has been exceeded, often by changing the color or graphical layout of the visible element of interest, making some other sort of visual change in the display, or even signaling by other sensory means such as mild vibration, sound, other method. If the user's eye gaze continues to remain within the eye position zone for this particular visible element for a time period exceeding a second key press time interval, then the system will register that a virtual key corresponding to this particular visible element has been pressed by the user. The user and system can then use this "virtual key press" to control various functions such as transmitting or receiving information, retrieving or storing information in memory, general system control, and controlling other outside devices as well.

In particular, the method will often use an interface based on the concept of a virtual rotating wheel, cylinder, or other virtual solid that has various visible elements, again often symbols such as letters, numbers, and punctuation marks, around the surface or circumference of this virtual sold. Only some of the visible elements will generally be presented at any one time to the user via the virtual display, but by gazing at appropriate controls to rotate the virtual solid, or move to different rows of symbols on the surface of this virtual solid, the sequence of displayed visible elements can be scrolled through in a predictable manner, and by gazing directly at any specific displayed visible element of interest to the user for a sufficient period of time, this visible element can be registered as a keystroke by the system, and thus used for various functions as described above.

DETAILED DESCRIPTION OF THE INVENTION

Figure 1:
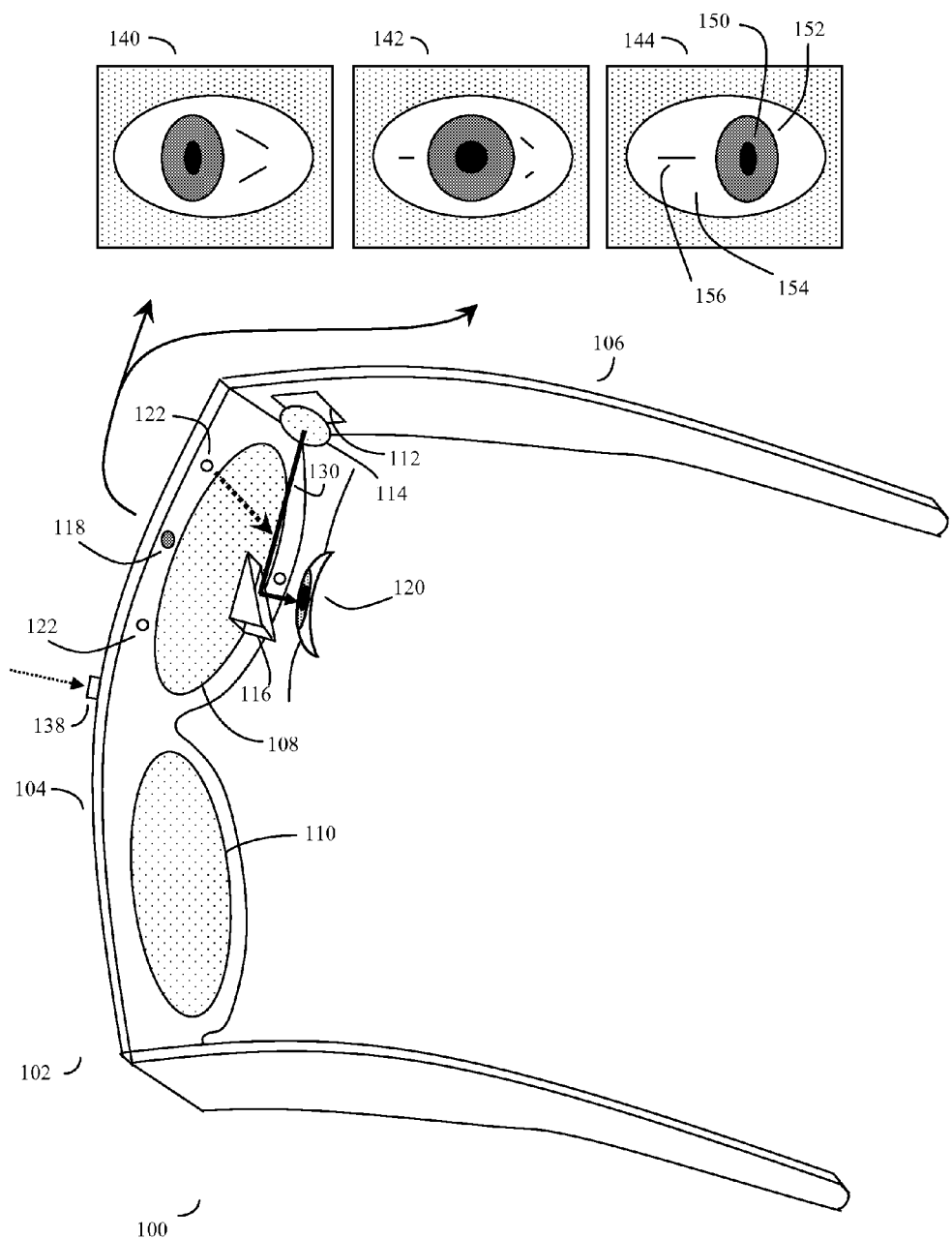
FIG. 1 shows an example of one type of device where the invention's eye gaze user interface may be implemented.

Although various eye gaze controlled devices have been proposed, exemplified by copending patent application Ser. No. 12/842,315, the contents of which are incorporated herein by reference, in addition to the rather complex problem of providing the eye gaze controlled device itself, a second major problem is to devise a simple to use but flexible user interface to control these devices. Here the problems in designing such a user interface should be appreciated. The human eye, which acts as a bit of a cross between a camera and a scanner, is in near constant motion. Instead of gazing at an object of interest in a fixed manner like a camera, the eye also moves to scan the object of interest and the surrounding area as a series of rapid eye motion saccades. Thus in order to determine exactly what an eye is really looking at, the eye position sensors must generally track the eye's direction of gaze for a sufficient period of time to compute a reasonably accurate average gaze position. Thus there is a bit of a trade-off between eye tracking accuracy and time.

In general, in order to respond rapidly to user eye gaze commands, less time can be spent in determining the average eye gaze direction, and as a result, eye gaze direction determination accuracy will be less. To accurately distinguish between different targets, then a fewer number of eye gaze targets and target directions can be used.

Conversely, although with a greater amount of time the average eye gaze direction can be more accurately discerned, allowing for a greater number of eye gaze target directions and different targets to be distinguished, the actual rate of communication may suffer if the time required to determine each eye gaze target takes too long. As a result, there is a bit of a compromise between the number of different eye gaze targets, and the angular separation between the display of these different eye gaze targets, and the time needed to accurately distinguish between these different eye gaze targets.

In a situation where each eye gaze target more or less approximates a symbol keystroke, this means that for high speed operation, the user interface should be designed to account for these tradeoffs between number of different eye position targets, and the average time required to reliably detect eye gaze on these targets. As a result, in contrast to a normal computer keyboard which may have 50 to 100 different finger positions or keys, the user interface for an eye gaze controlled device will generally have a significantly smaller number of eye targets.

Another problem is that although it is not overly difficult to control the transmission of a limited amount of information using only a few eye gaze positions, in general to send useful text messages and other complex information, a wide variety of different symbols must be transmitted. Alternatively, the same sort of problem occurs when a user may wish to use an eye gaze controlled device to perform other sophisticated functions. For example a paralyzed or handicapped individual may wish to use an eye gaze device to control the operation of a powered wheelchair, or even, for example, to use an eye gaze device to control the operation of a robotic arm attached to the powered wheel chair. This can require a lot of different commands.

The present invention discusses a flexible type of eye gaze user interface and method designed to work within these limitations. Although the method generally shows far fewer different targets or target symbols for the eye to gaze upon than does a standard keyboard, the method is designed to be both scalable—that is gracefully go from a very limited number of different targets or symbols to a larger number of targets or symbols, and at the same time sophisticated in that the method allows for a great variety of different symbols and commands to be transmitted using only relatively few different eye gaze directions.

Although the invention's eye gaze controlled user interface may be implemented on a wide variety of different eye gaze detection devices, in some embodiments, the invention's eye gaze user interface may be implemented on devices that have an outward appearance resembling standard eyeglasses or sun glasses, such as the devices described in patent application Ser. No. 12/842,315. The method will generally be implemented in software, designed to run under one or more microprocessors, on various types of eye gaze detection devices.

Here, a method of controlling a head-mountable, vision-controlled, device for transmitting and receiving information from a human user with at least one eye is disclosed. Note that this vision-controlled device will generally have a virtual display and at least one eye position tracking sensor. The method works by displaying a plurality of visual targets on the virtual display. Generally each visual target will comprise at least a visible element (such as a visible symbol, which will often be a standard letter or number symbol) embedded within an eye position zone (that is, an eye gaze target area) with an area that is generally equal to or larger than the visible element. In other words, each visible element or symbol will generally be presented in the context of a larger eye position zone region where a human eye gazing at that particular visual element will be considered to be gazing at that particular visual element or symbol, and thus a prolonged eye gaze falling within the eye position zone will be assumed by the system to be corresponding to an intent to select that particular symbol, much as pressing a key, or hovering over an active element of a screen with a mouse, may be assumed by other computerized systems to constitute user interest or intent to activate or select that particular key or element.

It should be understood that the invention's eye gaze user interface and method can be implemented on a wide variety of different types of eye gaze detection and virtual display devices, some head mounted, and some not. In some cases the device may be head mounted, and in other case the device may not be head mounted. Some devices may only monitor the gaze direction of one of the user's eyes, while other devices may monitor the gaze direction of both of the user's eyes.

The device will generally have a display upon which various visual targets, such as symbols, may be displayed in order to give the user something specific to gaze at. Although in this specification, generally such displays are shown as see-through virtual displays (because this type of display enables a user to see the surroundings beyond the virtual display), in some embodiments the device utilize a standard, non-see-through, type display The device may monitor eye gaze directions by many methods, including video cameras trained on the eye along with automated image analysis software that interprets eye gaze direction from the visual appearance of the eye. Alternately the device may monitor eye gaze direction by bouncing light off of the surface of the eye and noting the direction of the reflected beam or beams of light, or other means.

The device will typically be a computer operated device, often including at least one microprocessor, memory, and software to control the visual display. The device will generally take input from the eye gaze sensor or sensors and convert this input into an eye gaze direction, as well as correlate this eye gaze direction with the a particular visible element and eye position zone associated with this particular visible element on the devices' display.

The device may additionally contain communications devices, such as wired or wireless network connections to communicate to and from other outside devices, cell phone networks, and networks such as the Internet. Note that although in some embodiments, this microprocessor and communications devices may be internal to a device that in turn is mounted on the user's head, in other embodiments, the device may be more of a dumb device, and microprocessor(s) and communications devices may instead be outside of the device, and in some cases connected to the device by a cable.

Figure 2:
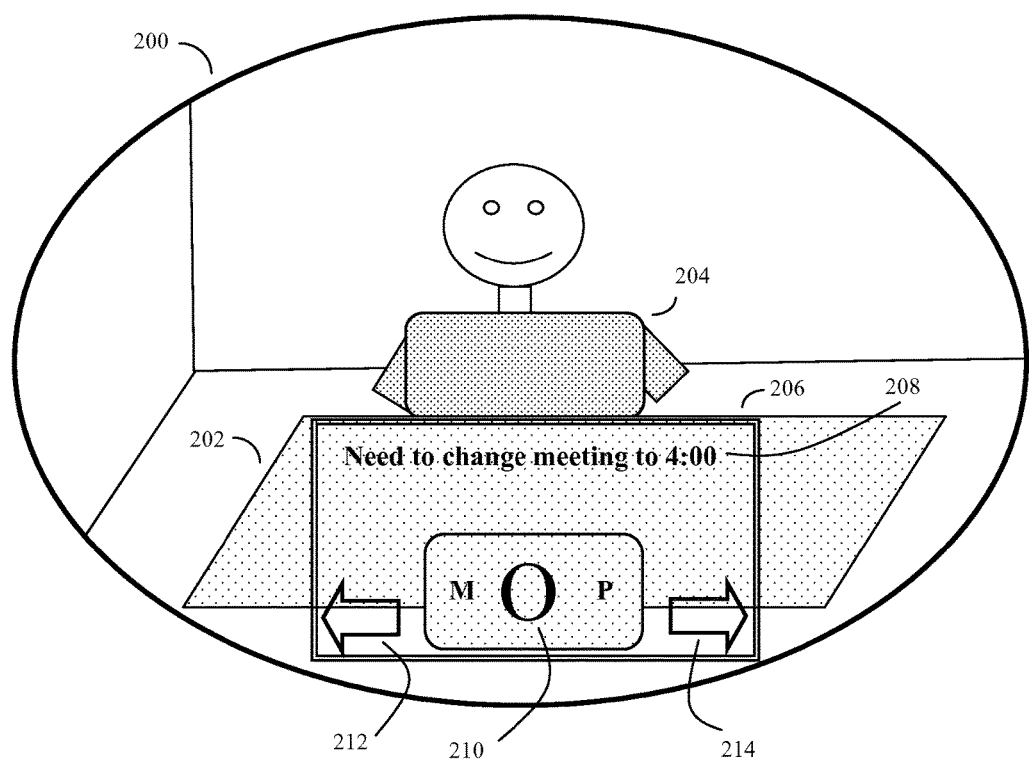
FIG. 2 shows an example of a user's view through the device of FIG. 1, showing a simplified version of the invention's user interface.
Figure 2:
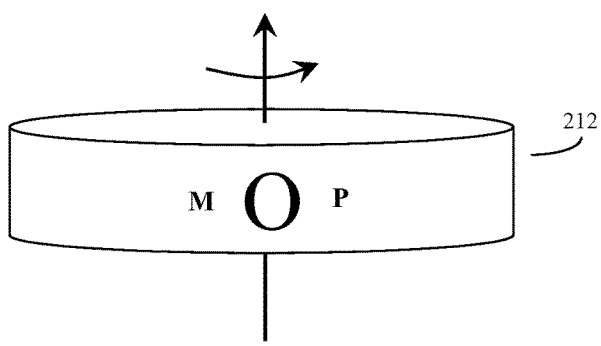
Figure 3:
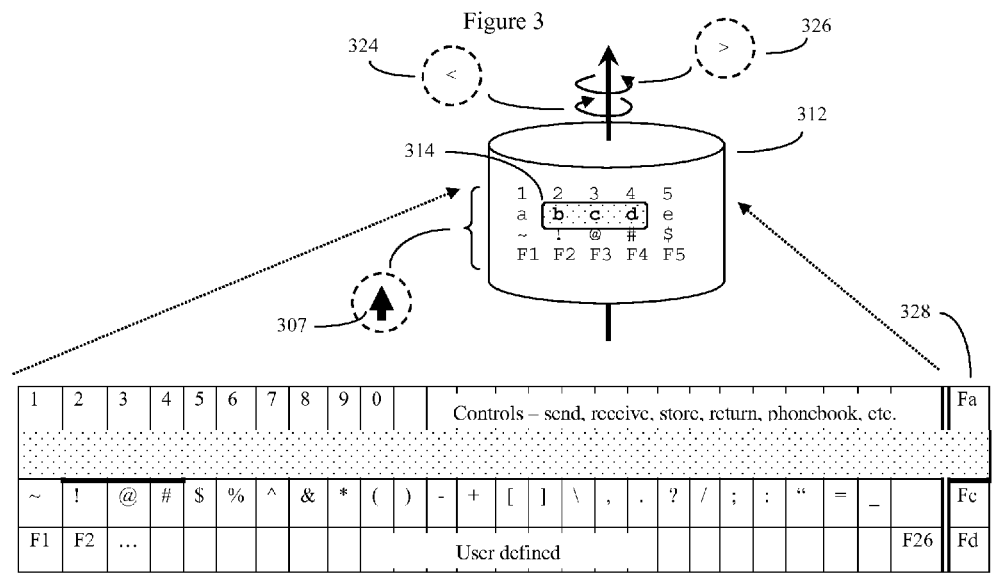
FIG. 3 shows a more detailed overview of the invention's eye control user interface and method.
Figure 3:
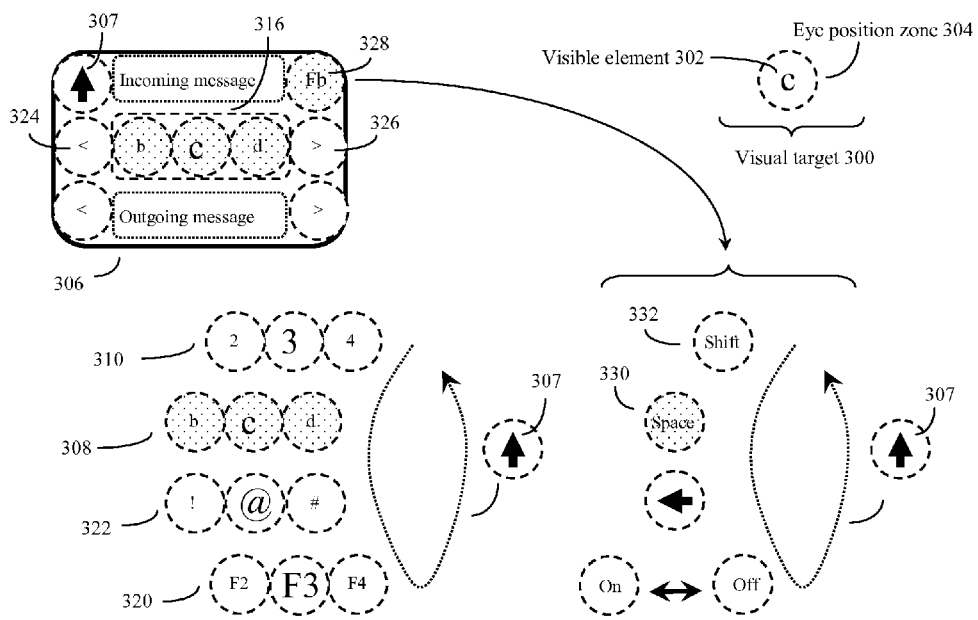

Although the invention's user interface and method can thus be implemented on a wide variety of different eye gaze devices, for purposes of simplicity and ease of understanding, many of the specific examples and illustrations used in this specification will be based on the specific eye gaze controlled device shown in FIG. 1, which in turn is based on FIGS. 1-3 of patent application Ser. No. 12/842,315.

FIG. 1 shows an overview of one specific example of an eye gaze interface device (100) suitable for the invention's user interface and method, here configured to resemble eyeglasses or sunglasses. In this example, the eye gaze interface device (100), may be based on a head-mounted or mountable frame (here an eyeglass frame) (102). This head-mounted or mountable frame (102) may be divided into a frame front (104) and two frame temples (106) that extend over or behind the ears to hold the head-mounted frame in place. The frame may have one or usually two lenses, such as eyeglass lenses or sunglasses lenses (108) and (110).

The device will often have an optical system, that may consist of a display (112), a display lens or mirror such as a converging lens or mirror (114), and a beam splitter (116) which may either be mounted on the eyeglass lens (108) or may be held separately.

The device's eye tracking sensor, which may be one or more miniaturized video camera(s) or other types of eye position sensors is shown as (118). One or more eye illumination lights, such as near infrared lights, configured to shine near infrared light onto at least one of the user's eyes (120) is shown as (122).

In operation, display (112) which may be located in the inner portion of the frame temple (106) near the frame front (104) may display a message—for example a brief text message from the user's supervisor such as "What number should I call to reach our client?". The display will show this message. Depending upon the type of display used and environmental conditions, the display may be back lit or illuminated (not shown) to provide better contrast.

In some embodiments, the display will be located too close to the user's eye (120) for the eye to focus on properly. To correct for this, the display may be imaged by a mirror or lens, such as a converging lens (114), to correct the light rays (130) so that they appear to be coming from a more distant virtual object. The light rays then may pass through the beam splitter (116), and into the user's eye (120). The user will see the image of the display and the message as if the display and message were floating in the air in front of the user. At the same time, the user will also be able to see distant objects through the eyeglasses lenses as well. Although only a one eye display is shown in these examples, this optical system may be replicated on the other side of the frame as well, thus allowing both of the user's eyes to see the message.

Here the eye tracking sensor, such as a frame mounted camera (118) can track the motion and gaze direction of the user's eye (120). For example, the user's eye (120) may be illuminated by near infrared light from one or more frame mounted infrared lights (122). The frame mounted video camera (118) which is focused on the user's eye (120) captures images of the eye (120) as the eye gazes in different directions, and looks at different virtual targets presented by the visual display system. Some of the images captured by video camera (118) as the eye (120) looks in different directions are shown as (140), (142) and (144). In (140) the eye is looking to the left, in (142) the eye is looking straight ahead, and in (144) the eye is looking to the right. In many embodiments, the eye tracking sensor will be mounted or coupled directly to the frame. On other embodiments, the eye tracking sensor will not be integrally mounted or coupled to the frame, but may rather be attached and detached from the frame.

In the case where the eye tracking sensor is a video camera (118), this camera can look at a number of different visual elements of the eye. These elements include the relative shape and location of the pupil (150), the iris (152), and sclera (154) of the eye, along with assorted blood vessels (156), and other distinguishing marks on the sclera. In addition to these features, motion of other eye structures, such as the eyelids, blinking rates and patterns, squinting, etc. may also be monitored.

It should be evident, however that the eye gaze interface of the present invention will work with many types of other eye tracking devices. Thus this specific example has been given for illustration purposes only, and is not intended to be limiting. The essential elements for the eye gaze platform itself are that the eye gaze platform be able to sense eye gaze angles to within at least about a +/−10 degree field of accuracy. It will often be useful if the eye gaze platform also presents a real or virtual screen upon which various eye gaze targets, which in turn will correspond to various eye controlled symbols or "key", can also be implemented.

In some embodiments, the eye gaze interface device may also have one or more cameras, often video cameras oriented to view the outside world (138), often from the point of view of the user. Such cameras, which may also have microphones as well, may be useful for augmented reality applications, as well as to allow the user to discretely photograph his or her surroundings by moving his eyes gaze at one or more appropriate user interface symbols or targets to operate the camera. Note that here, various regulations may require that the eye gaze interface device also have a built in speaker to generate an audible sound, such as the sound of a camera shutter or other warning, when camera or camera(s) 138 is used for image, video, or video/audio recording purposes.

One embodiment of a suitable visual display is shown in FIG. 2. Here the user is wearing the device shown in FIG. 1, and the overall view (200) shows the user's view, as if peering out through glasses. The user is sitting at desk or restaurant table (202) across from another person (204), and the view of the other person and other outside world objects in the upper part of the scene is unobstructed. In the lower part of the scene, the user sees both a view of the outside world, and a view (206) of the display (112) as conveyed to the user's eye by way of correcting lens (114) and beam splitter (116) (here drawn for simplicity as a prism). As previously shown, here the beam splitter is again placed in the lower portion of the field of view, in a manner similar to a bifocal lens arrangement.

In the upper portion of the display (206), the user sees a view of an incoming message, such as a text message (208), which has been received by the device's transceiver. In the lower part of the display, the user is operating a gaze based interface to select the letter "O" to form the desired "OK" response to transmit. In this example, various symbols (letters) (210) intended for transmission zoom in and out of view as if the letters were rotating on the surface of a virtual wheel (212) or other virtual solid spinning perpendicular to the user. Note that here, this "virtual wheel" is a software construct, generated by executable code, and the use of the "virtual wheel" model is intended to convey in simple terms some of the various functions that the device's display software may employ in the process of generating the visual user interface.

In addition to displaying letters, various control symbols, for example symbols for "space", "backspace", "capital letters", "send", "receive", "next message", "previous message" and the like may also be put on the surface of this virtual wheel (212) and displayed to the user.

In some embodiments, it may be useful to group the letters not in standard alphabetical order, but rather grouped according to frequency of use, so that the most common letters in the user's language of choice are grouped together. For example, for English, the letters used in the highest frequency on average are, in order from most frequently used to least frequently used is: "E T A O I N S H R D L C U M W F G Y P B V K J X Q Z". Thus it may be useful to group the letters by frequency of use so that the user time required to scroll to a particular letter is reduced accordingly. With use, the device might also start to learn what any given user's particular choice of letter use or other symbol use is, and adjust the position of these letters and symbols on the interface accordingly so as to improve efficiency. In these examples, however, the letters and numbers are grouped in their normal standard order.

In addition to letters, numbers, and control characters, simple phrases, such as "OK", "Yes", "No", "Busy", "Get back to you soon", and so on, along with various user determined pre-coded messages, may also be encoded as particular symbols, such as user definable function keys Fn. Indeed, such phrases may be pre-encoded along with the appropriate commands to reply to an incoming message and transmit, so that a use need simply glance at the symbol for OK for a sufficient time, and the system will know to then respond to any incoming text message with this response. The device may also be programmed append additional explanatory text, such as "sent from an eye-gaze commanded device" or the manufacturer's proprietary name for the device, so that the recipient of the return message will not be put off or offended by the occasionally brief or terse nature of the response.

In one user interface embodiment, the user may select which letters, numbers, or control symbols to use by gazing at a left rotate (212) and right rotate (214) control targets, which may control the order in which the letters are displayed by, for example, rotating the virtual wheel (212) in the selected direction. The user can then select the desired letters numbers, or control symbols by gazing at the displayed letters, numbers, or control symbols for a sufficient amount of time to let the system know that this letter number, or control symbol is desired.

Many other alternative embodiments are possible. In one alternative embodiment, the virtual wheel (212) used to determine the order in which letters, symbols and control elements or symbols are displayed can be a virtual sphere, and the user can rotate this sphere around more than one axis by appropriate gazing at control targets. In another alternative environment, more than one type of virtual wheel (212) may be used, for example one for the alphabet, one for predetermined messages, one for numbers, one for control commands, one to speed dial frequent contacts, to further enhance the speed and flexibility of the interface.

Here some of these alternative user interface embodiments will be discussed in more detail.

In this discussion, the various regions of the display that can be activated by a user gaze that exceeds a preset limit of time are referred to as "keys". Although it should be understood that these "keys" are in fact simply controlled by sensor determination of eye angles in relationship to a virtual target projected by an eyeglasses mounted display, for simplicity, often it is useful to use the term "keys" because this term rapidly conveys the concept of the actions that may follow once the user's eye gazes at the appropriate visual target for a predetermined length of time.

In this discussion, the ability of the system to track eye movements has been set to a very conservative value of +/−4.5 degrees, or roughly a 9 degree circle surrounding the location of a visual target. The eyeglasses are assumed to cover a 45 degree wide angle from side to side, and a 30 degree angle from top to bottom. It should be understood, however, that these particular values are simply for purposes of conveying a specific example of the invention's user interface.

FIG. 3 shows an overview of the invention's eye control method. The interface generally follows the "virtual wheel" or virtual "cylinder" (or other virtual solid) software construct previously shown in FIG. 2 and in patent application Ser. No. 12/842,315, the contents of which are incorporated herein by reference.

In this scheme, the visual targets (300) may be composed of visible elements such as letters of the alphabet, numbers, punctuation symbols, system controls, and user defined keys, which are mapped into various rows and columns on the surface of a virtual solid such as a virtual cylinder (212). A small window (314) from this virtual solid (312) is in turn shown on a corresponding window (316) on the virtual display (306) at any given time. Here the virtual display (306) corresponds to the display (206) previously shown in FIG. 2.

Around each visible element (302) is a eye position zone (304) that defines the region where a user's eye or eye's may gaze at, and even wander a bit, but if the eye generally remains within this zone for a sufficient amount of time (such as at least a hovering time interval), the system will indicate that it thinks that the user is at least interested in this key, and will signal that it has determined user interest in the key back to the user. This eye position zone roughly corresponds to the angular region (in degrees) in which the eye gaze direction can be accurately determined for a particular user on a particular device, and with a particular eye gaze averaging time. Thus, depending upon the limitations of the particular platform upon which the method and user interface is implemented, the apparent diameter of the eye position zone may vary.

In some embodiments, the virtual solid or virtual cylinder (212) may contain only one row of virtual targets, and this type of embodiment was previously shown in FIG. 2 (212). However in order to implement still more virtual targets or virtual keys, often it will be convenient to have an embodiment with multiple rows of virtual targets, as is shown in FIG. 3 (312).

In order to shift between rows, a defined key, such as an up-arrow key ˆ(307), may be used to move the focal point of the interface (316) to different rows of the cylinder. Thus by gazing at the up arrow key ˆ, the user could transition between a display of letters (row 2) (308) and a display of numbers (row 1) (312), or a display of user defined function keys (row 4) (320), or a display of punctuation symbols (row 3) (322). The user may rotate the virtual cylinder to the right or left by gazing at appropriate left < and right > direction keys (324), (326).

Each row of the cylinder may additionally have one or more keys F(a), F(b) . . . F(n) (328) (abbreviated Fa, Fb, Fn) that remain constantly displayed on display (306) regardless of the rotation of the virtual cylinder (312). These constant Fn keys can be conveniently used to control frequently used controls, such as space, shift (capital letters to small letters), backspace, and display on/off.

To simplify the user interface, the letters may follow a standard convention, such as a presumption that the letters are always to be lower case except at the beginning of a sentence.

Since the space character is generally more highly used in writing than the shift key, it may be convenient to associate the letter row Fn button with a space bar (330), and place the shift key (332) in another row.

The interface may be designed to allow the user to redefine keys according to personal tastes, of course.

Note that although, for simplicity, the virtual solid will often be spoken of as a virtual cylinder, which somewhat implies that different rows of symbols on the surface of the virtual cylinder may have the same number of symbols and same amount of spacing, in fact this does not have to be the case. In some embodiments, the virtual solid can be configured like a sphere or other surface of revolution with some rows having a more symbols than others. Likewise there is no requirement that the solid be smooth—virtual cubes, triangles, and or irregular shapes may also be used.

Figure 4:
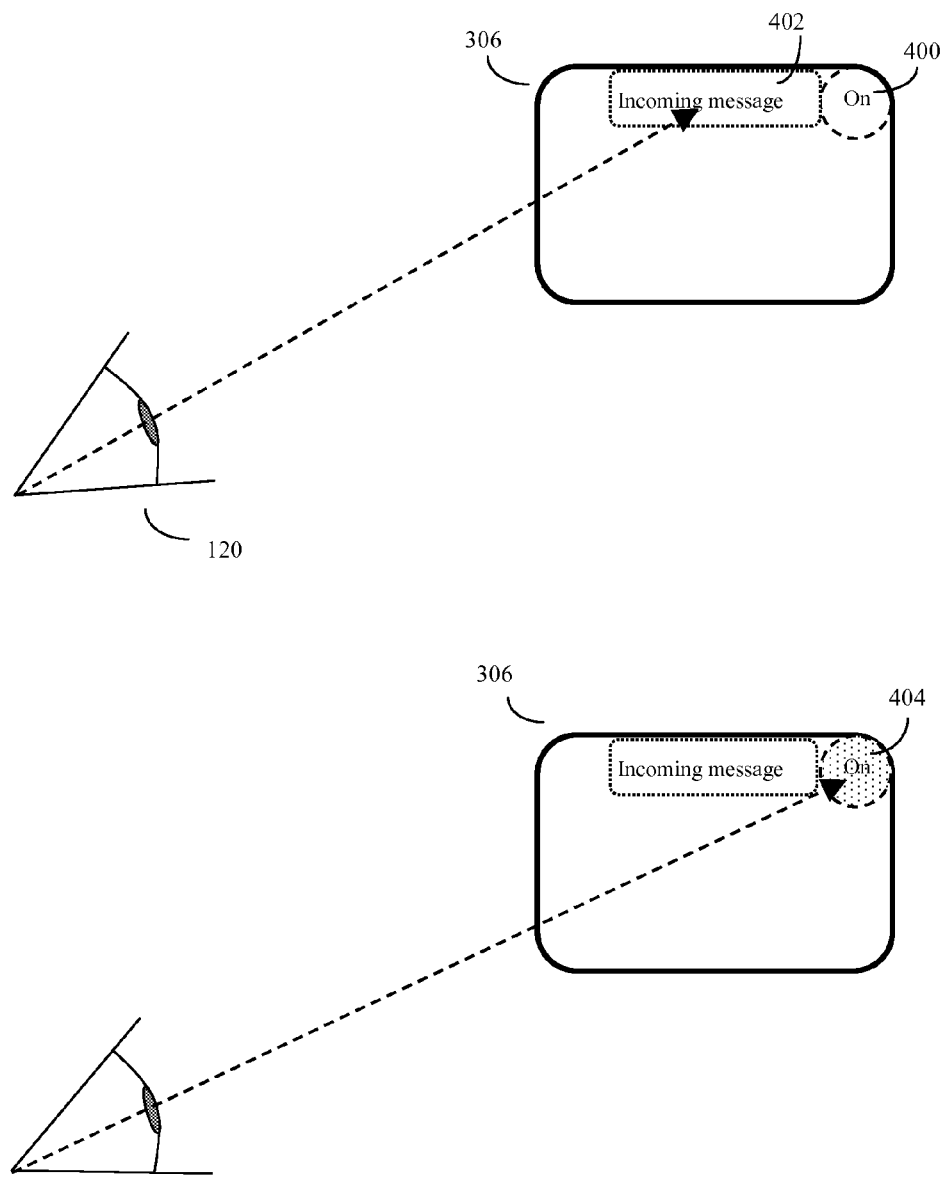
FIG. 4 shows an example of the user interface in action.

FIG. 4 shows an example of the user interface in action. Here the system, when not in use, may generally be in a "standby mode" in which at most only a small section of the display, such as an "On" key located off to one corner (400), is sensitive to user eye position. This will allow the user to move his or her eyes in a generally normal manner, regarding the outside scene, when the device is not being used to transmit data.

In FIG. 4, from standby mode, the system may receive an incoming text message (402) or other system alert, and may display this message in one part of the display. The user may decide to read this message without necessarily responding to the message. However if the user decides to respond to the message, the user may turn the system from standby mode to a full "On" mode by gazing at the "On" key (400) for the appropriate length of time.

In one interface embodiment, if the user glances at the "On" key for a first transient period of time T1, then the "On" key will not respond. If the user glances at the "On" key for a longer period T2, then the "On" key will become highlighted (404) or otherwise let the user know that the key is about to be activated. At this point, the user may either glance away from the key, or alternatively, if the user continues to glance at the key for a still longer period of time T3, the key will be considered to be activated or "pressed", and in this example the system will go a full active mode. This same T1, T2, T3 scheme will also be used for the other eye gaze controlled "keys" in this example.

Figure 5:
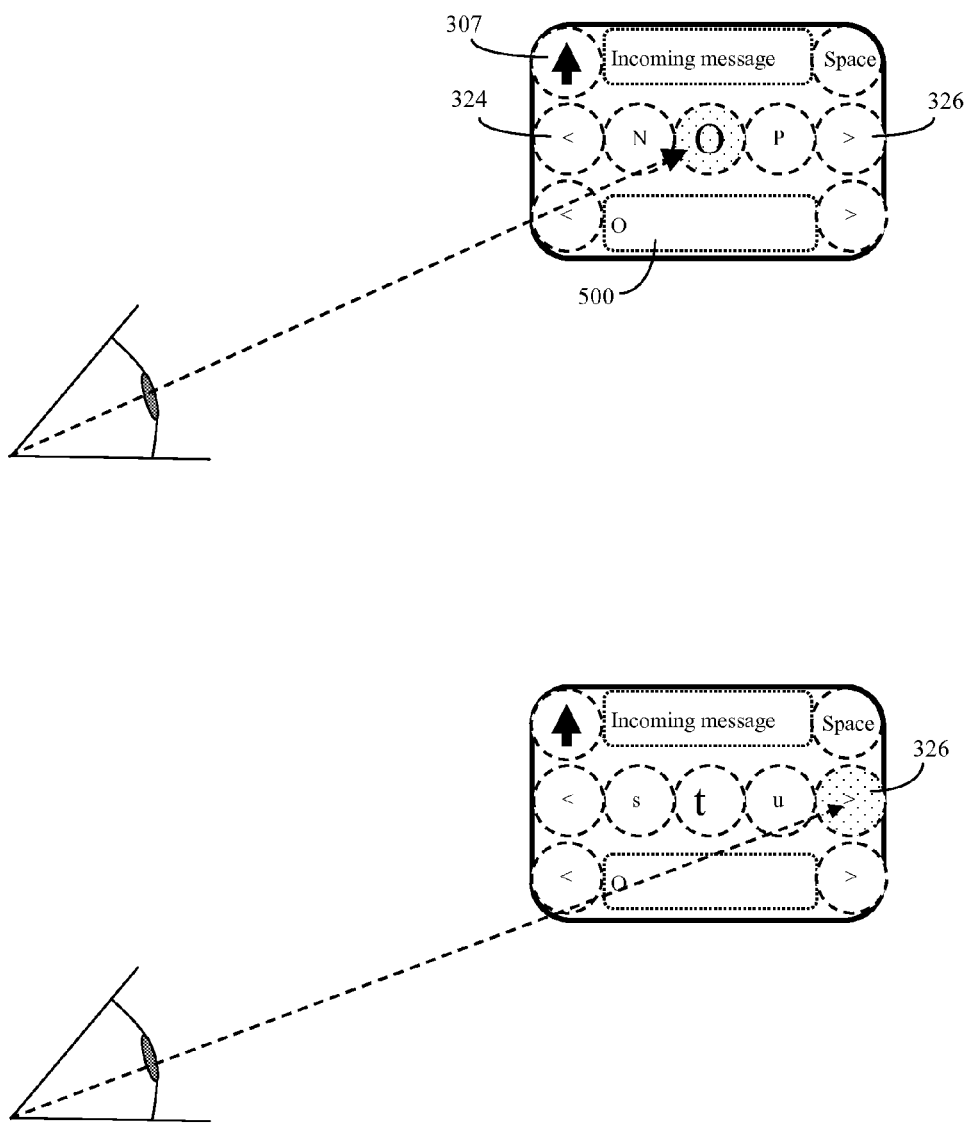
FIG. 5 shows the user interface in full active mode.

FIG. 5 shows the user interface in full active mode. In active mode, more display elements are active, and the display generally will be sensitive to a much broader range of eye movements. In FIG. 5, the user has started to send an outgoing message by first selecting the appropriate row using the up arrow ˆkey (307), and then selecting the appropriate column using the left < and right > keys (324), (326). Here the user is in the process of activating the first letter of his response, which in this example is a capital "O" because this is the beginning of a sentence. This first letter O is shown in the outgoing message box at the bottom of the display.

Once the user has selected the first letter, the user can then select the second letter (here the next letter will be a "u") by gazing at the right > key (326), causing the virtual cylinder to rotate so that the letter "u" is now in the center position. In FIG. 5, the virtual cylinder is still in the process of rotating, so that a non-desired letter "t" is presently in the center position. So the user must continue to rotate the cylinder by continuing to gaze at the right > key (326).

Figure 6:
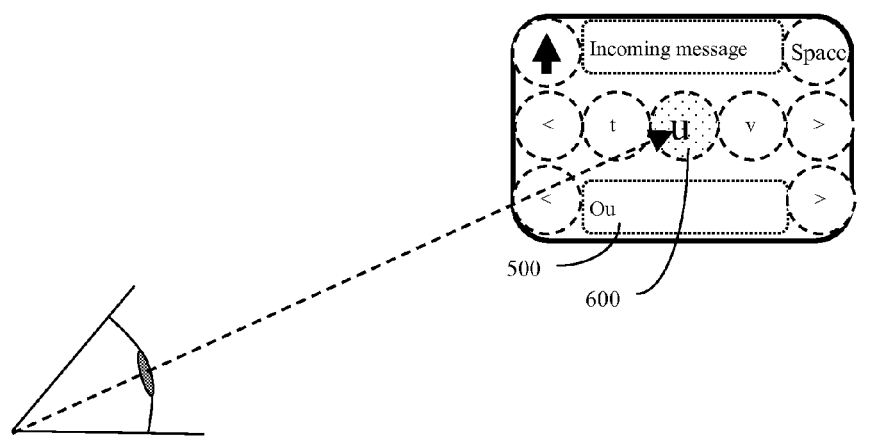
FIG. 6 shows a user generating an outgoing message.
Figure 6:
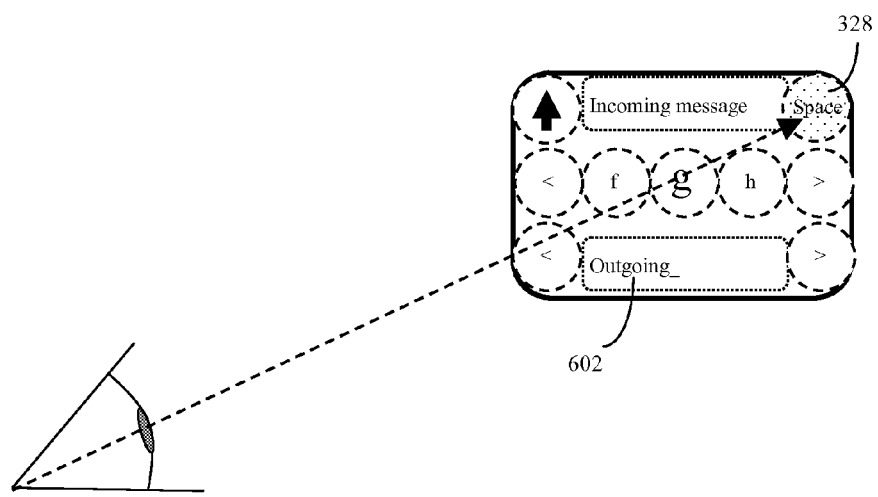

In FIG. 6, the desired letter "u" is now in the center position, and the user has just selected it by gazing at if for a T3 length of time (600). The outgoing message is starting to be constructed in the outgoing message box (500), and this can be seen as the letters "Ou".

In FIG. 6 bottom, this process has continued, and the user has just finished constructing the first word "Outgoing" (602). The user is now in the process of indicating a space by gazing at the Fn button (328), which for this row of the virtual cylinder has been assigned to correspond to a space-bar key.

Figure 7:
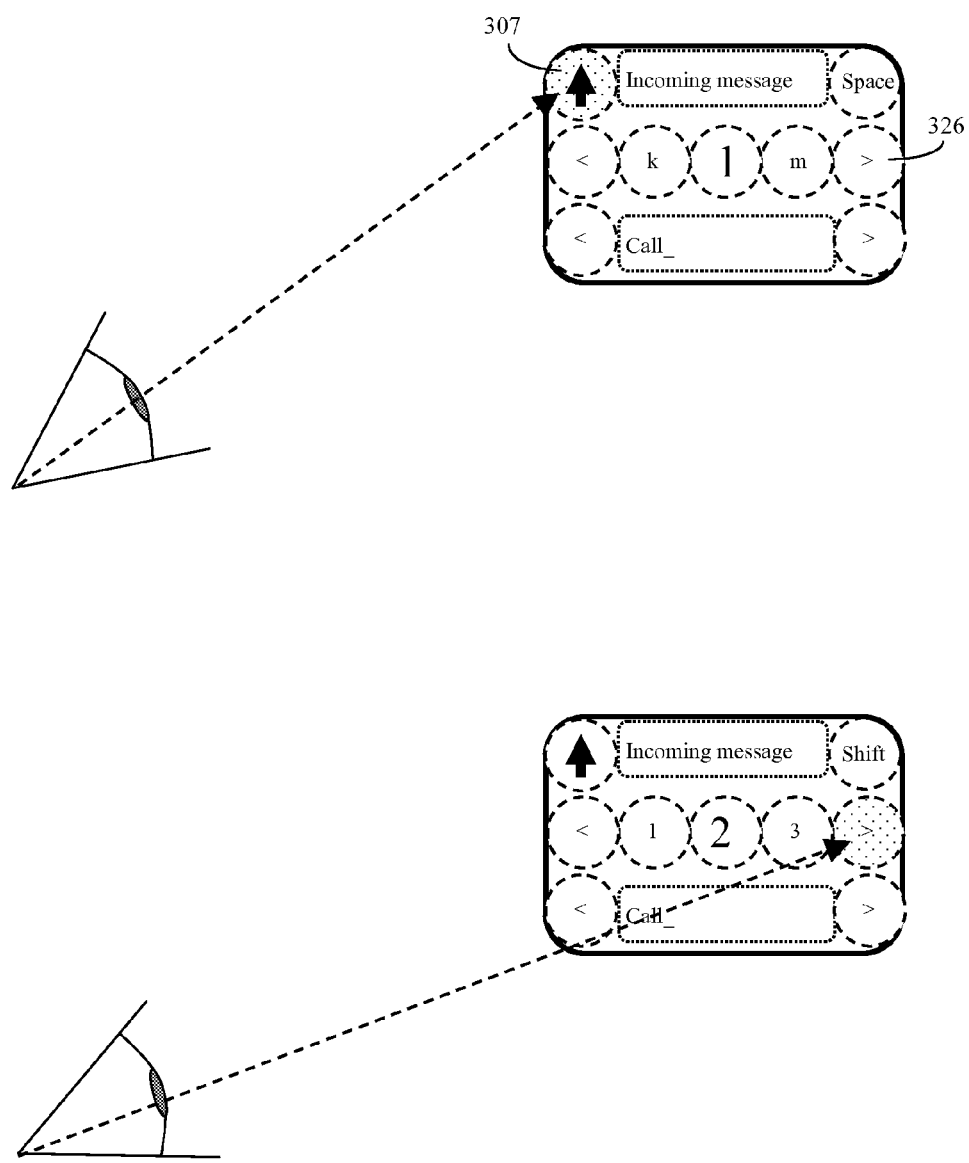
FIG. 7 shows a user generating a different outgoing message involving numbers.

In FIG. 7, the user is now trying to send a different message, which is for a co-worker to call a certain phone number. Here the user has finished constructing the first word of the message, which is "Call", and now the user wishes to start entering numbers, which are located on a different virtual row of the virtual cylinder. Here the user can tell the system to shift to a different virtual row by gazing at the up arrow button ˆ(307) for a T3 length of time.

In FIG. 7 bottom, the user has successfully transitioned to the number virtual row of the virtual cylinder (310), and is now moving the virtual cylinder to find the desired first digit of the phone number by gazing at the right > (326) key.

Figure 8:
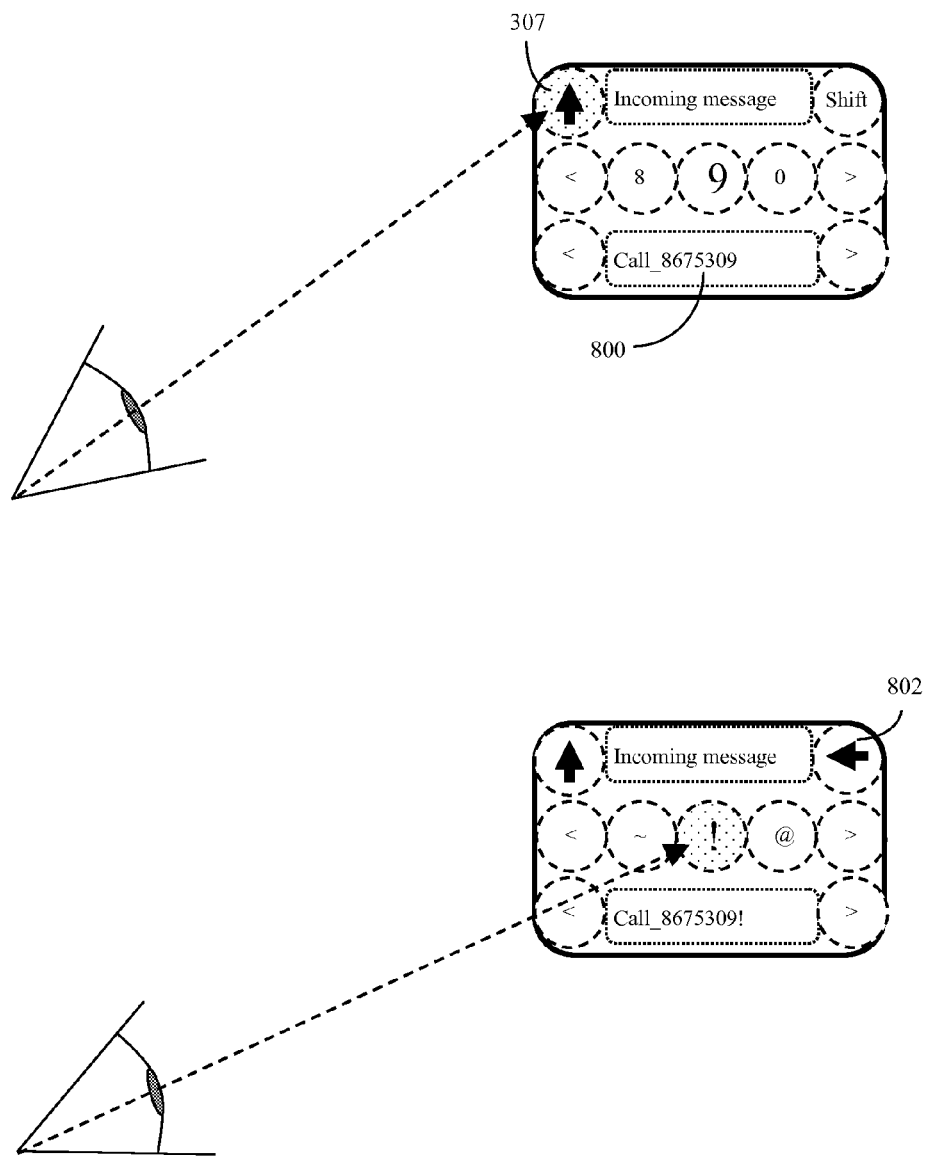
FIG. 8 shows a user now generating a punctuation symbol for an outgoing message.

In FIG. 8 top, the user has finished constructing the phone number, and now wishes to indicate to the co-worker that the message is urgent by appending a "!" to the end of the message. Punctuation may be on yet another virtual row of the virtual cylinder, so here the user may shift to the punctuation virtual row by again gazing at the up arrow key ˆ(307).

In FIG. 8 bottom, the user has now moved to the punctuation virtual row (322), and has selected the desired "!" symbol by gazing at it, and now the outgoing message, "Call 8675309!" is complete (800).

Figure 9:
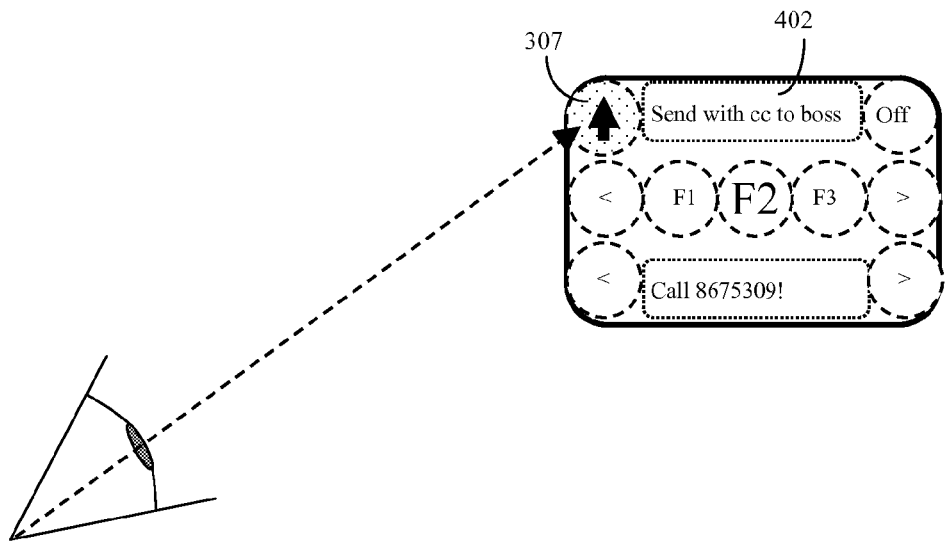
FIG. 9 shows a user using special purpose function keys.
Figure 9:
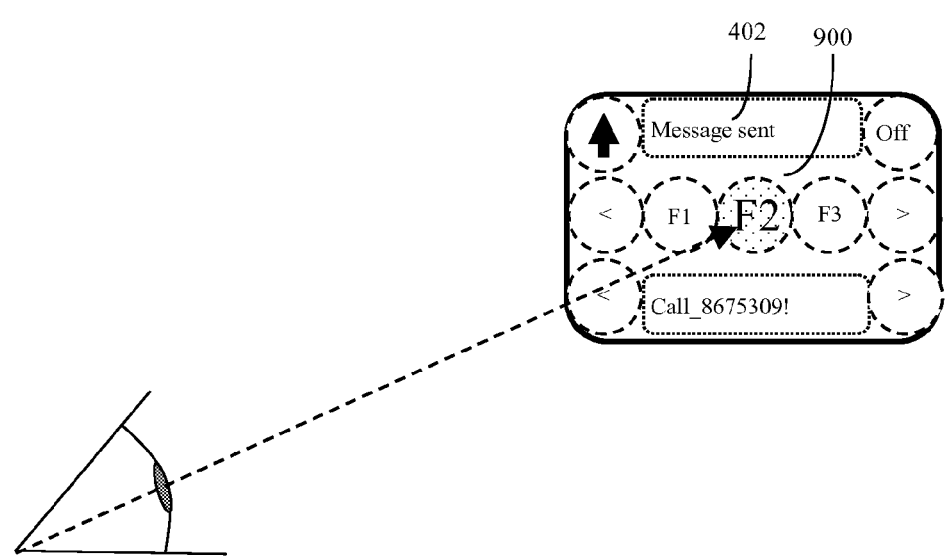

In FIG. 9, the user wishes to send the response back to the originator of the last text message to him, but also wishes to also send a copy to his boss. In this example, the user may have predefined a user key, such as F2, to be: "Send response back to last text message, cc boss's cell phone number". To achieve this goal, the user again gazes at the up arrow key ˆ(307) to select the user defined function row. Here the user defined function row may be an intelligent row (320) of function keys that might select the most commonly used user defined option automatically.

The user can then easily send the text message back to the originator of the earlier text message, with a cc to his boss, by gazing at, for example, the previously user defined F2 key (900) for a T3 period of time. The system can in turn both remind the user of the function of the F2 key, as well as confirm when the message has been properly transmitted, by sending appropriate messages to the incoming message box (402).

Figure 10:
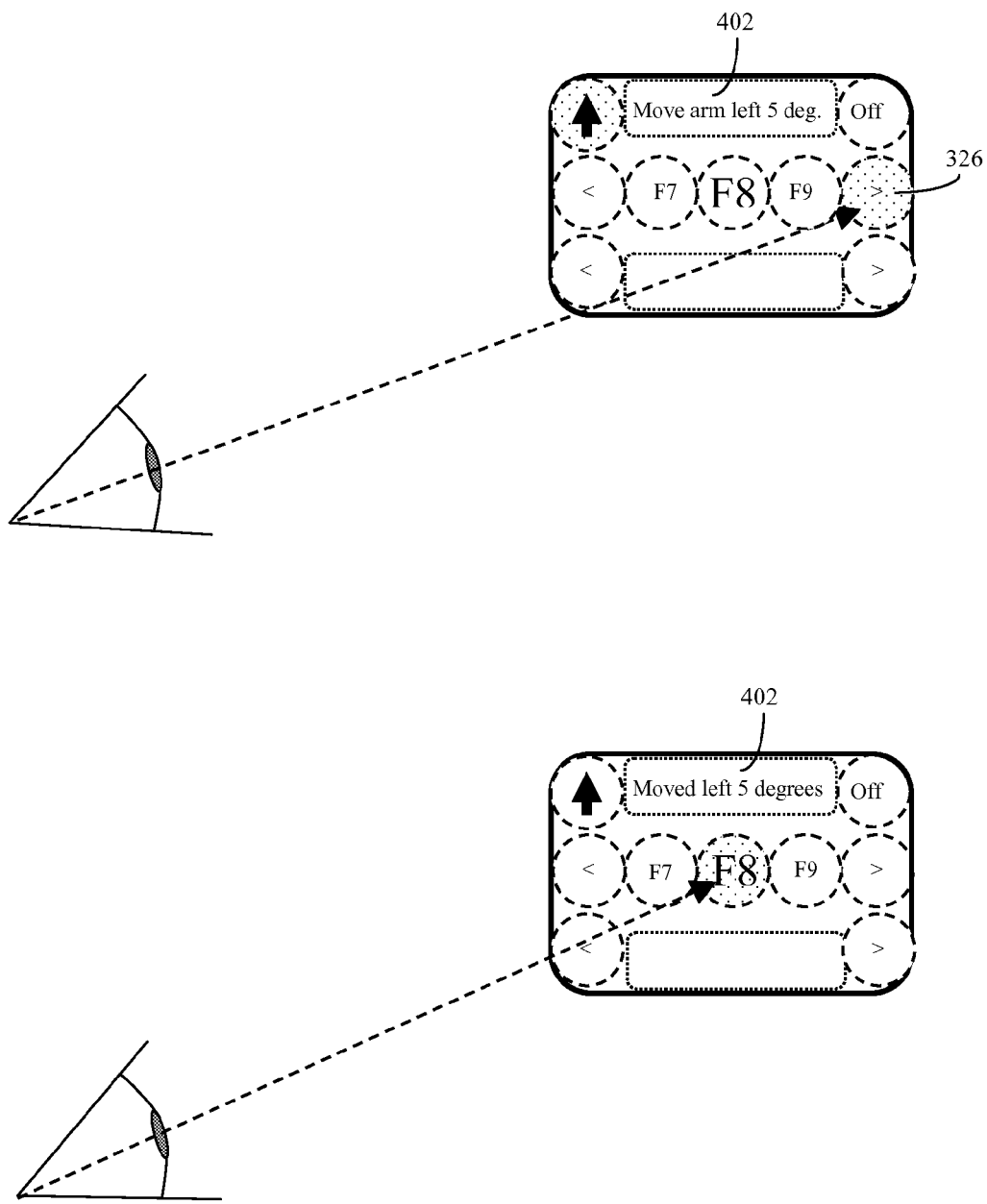
FIG. 10 shows a user the eye gaze interface to control a device.

In FIG. 10, the user may want to control a function that is entirely unrelated to text messaging. For example, the user may be a handicapped person desiring to operate an advanced powered wheelchair accessory, such as a robotic arm, in order to pick up a nearby object. Here, the user may have, for example, previously defined the user definable F8 key to be a key that sends a message move the robotic arm five degrees to the left.

In FIG. 10 top, the user again gazes at the right key > (328) to select the appropriate user defined function key, and the system reminds the user about the function of this key in the upper message box. Here, for example, the system is reminding the user that the F8 key was previously assigned the function to "Move arm left 5 deg.".

In FIG. 10 bottom, the user has then moved the robotic arm left by gazing at the F8 key for a period of time T3, and the system has confirmed that the "Move arm left" command was sent by displaying a "Moved left 5 degrees" message in the upper message box (402).

Figure 11:
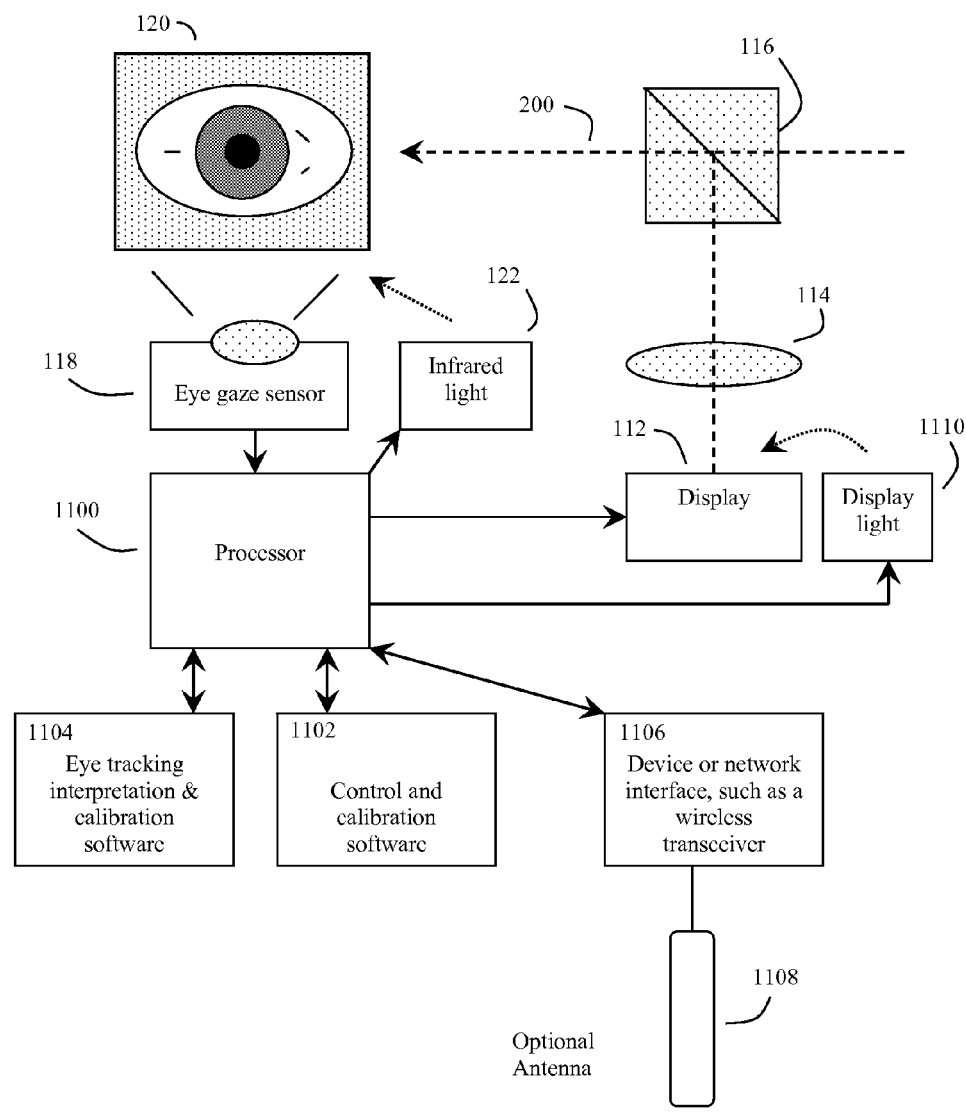
FIG. 11 shows one example of the electrical circuitry and software that may be used to implement the present invention's eye gaze user interface and calibration method

FIG. 11 shows an example of the electrical and optical circuitry that may be used to implement the invention's eye gazing user interface method. Often the user interface and method will be implemented in the form of software designed to run on one or more processors (1100), which may be microprocessors, possibly assisted, supplemented, or supplanted by one or more digital signal processors (DSP). The processor(s) in turn executes code or software, such as general control software (1102) and eye gaze tracking interpretation software (1104) intended to analyze input data of the eye returned from the eye position sensors (118), and determine from this data information pertaining to the direction of eye gaze, as well as various control signals, which may be conveyed by squinting, blinking, unusual eye movement and the like that may be useful for controlling the device. The task of calibrating the eye position sensors (which will be described in more detail shortly) may, depending upon the embodiment, be divided among either the general control software (1102) or the eye gaze tracking interpretation software (1104).

The processor(s) (1100) may operate one or more types of device or network interfaces, including wired or wireless transceivers (1106), which in turn may be connected to an optional antenna (1108) or wire connection which may be optionally incorporated or embedded into the head-mounted frame, such as the eyeglasses frame. The processor will also send data to a display (112) for creating a real or virtual display for viewing by the user. This may be done through optical system lens components (114) and beam splitter components (116) or by other display methods as desired. The beam splitter (116) may be implemented in various ways, including a semi-reflective and partially transmissive thin tilted plate of glass or plastic, cube beam splitter, prism design, or other optical configuration. The processor may optionally control a display illumination light (1110) to improve display visibility as needed.

In situations where the eye gaze sensor (118) is a camera, the eye gaze tracking software may be implemented using a variety of different types of image interpretation software. Some of these methods include the methods of Oyewole Oyekoya, *"Eye Tracking, A Perceptual Interface for Content Based Image Retrieval"*, Ph.D. Thesis 2007, Department of Electronic & Electrical Engineering, Adastral Park Campus, University Park London. Alternative methods include the methods of Selker et. al., *"Eye-R, a glasses mounted-eye motion detection interface"*, Conference on Human Factors in Computing Systems, CHI '01 extended abstracts on Human factors in computing systems, pages 179-180, and other methods.

The human eye has a number of visible sub-structures, such as the pupil, iris, and sclera, which artificial vision software can use to track the eye, and determine where the eye is pointing or gazing at any given moment of time. However, as previously discussed, using the gaze of the eye to control devices is complicated by the fact that the position of the eye is constantly shifting. The human eye does not gaze at objects of interest in a steady uniform manner, but rather scans objects of interest by a series of saccades or rapid eye movements. In this respect, the human eye acts much like a cross between a camera and a scanner, and indeed this scanning motion helps make up for the inherent deficiencies and limitations of the eye in terms of its performance as a natural camera.

In order to compensate for this constant movement, the eye tracking software and processor must take this natural constant saccade movement into account. Here other workers in the field, such as Oyekoya, have shown that when such constant movement is compensated for, eye gaze can be an effective way to understand user intentions, and in fact in some situations eye gaze can even select objects of interest faster than alternative user interfaces, such as computer mice.

The automated interpretation of human eye gazing is facilitated if the automated interpretation system knows the location of the objects of interest or targets that the eye is likely to be gazing upon. The automated system can then use its knowledge about the location of these targets, often called salient images, to help interpret the series of eye movements as detected by the artificial vision software. Here this target information is known because the invention is displaying these targets in specific locations in the invention's display (112).

Here the eye tracking software may operate by first storing in memory the location of various visual display targets, such as symbol targets and control targets that the system is displaying on display (112). The software may then process eye movement data and attempt to determine which target the eye is gazing on by, for example making use of algorithms such as the Oyekoya eye gaze interpretation software algorithms. These algorithms include steps such as determining if the eye is revisiting on particular target regions, and determining if the eye has a tendency to visit the target region just prior to the main incidence of target fixation. The speed of the eye saccade may also be used to give relevant information, because saccade speeds tend to slow down right before the target image of interest is selected. Other methods include determining changes in eye pupil diameter, because pupil diameter can tend to change when the eye is gazing upon an intended target region. Dwell time on the target may also be used because this also gives important information that the eye is fixing on a particular target.

The eye tracking software will often also use various statistical methods, such as Analysis of Variance (ANOVA) to analyze the eye tracking data, as well as to calibrate itself to the individual characteristics of any given user.

More specifically, one of the problems with prior art heads-up displays in general, and with prior art eye tracking systems in particular, has been the issue of how to best calibrate the device software for different users. Although the present inventions use of a more minimal set of fixed targets can act to reduce the need for individual user calibration, in some embodiments, additional user calibration may be desired.

In one calibration embodiment, the user may be instructed to gaze at the system's various virtual target areas, and the system's eye position tracking sensor, which here may be a camera, such as a camera sensitive to infrared light, can photograph the appearance of the user's eye or eye as the user's eye gazes at the various known virtual target areas. The appearance of the user's eye as it gazes at the various known virtual target areas can then be stored in memory, and then subsequently used by the system's processor using various pattern matching algorithms to best determine the position of the user's eye. In some embodiments, the light emitting diodes illuminating the user's eye may be set to illuminate the eye at different wavelengths, such as different wavelengths that tend to emphasize the contrast between various eye features to further facilitate eye position determination. The user may also be instructed to shift the position of the eye glasses device to various common locations (e.g. slipped down over the nose, tilted to the left or right, placed back in a level position at the optimum nose location, and the like) so as to increase the number of reference calibration images and data points.

In this embodiment, the invention may also be considered to be a method of calibrating the eye position tracking sensor of the previously described vision controlled device. Here the calibration method may, for example, comprise displaying, over various time sequences, different visual eye calibration targets in the device's virtual display. The user will also be instructed to gaze at each eye calibration target as it appears, such as "gaze at the letter "A" on the upper right hand side, now gaze at the letter "B" on the lower left hand side" and so on.

As an example of an eye calibration user interface, consider FIG. 3-10. The calibration software may send the user a text message on the incoming message display (FIG. 4 (402)) such as: "Calibration: look at ↑" [up arrow] (See FIG. 7 (307)), and use the eye gaze sensor (FIG. 11 (118)) to produce an image of the user's eye looking at (307). The calibration software may then send the user a text message such as: "Calibration: look at ←" [left pointing arrow] (see FIG. 8, (802)) and then use the an image of the user's eye looking at (802), and so on, generally hitting all four corners of the display, often the center of the display (e.g. FIG. 6 (600)) and other display regions as needed to produce an adequate series of calibration images.

During this calibration sequence, the processor controlling the device will know the location of each eye calibration target. The device can thus use its eye position tracking sensor to obtain eye calibration data as the user gazes at each eye calibration target. This can be, for example, one or more photographs of the eye, possibly illuminated at one or more wavelengths to improve contrast (i.e. distinguish eye blood vessels better) during these times. This eye calibration data can then be stored in the device's memory. Thus later, when the system may be showing multiple targets, the system can use this eye calibration data to determine which target the user is gazing at. Usually this will be done by using the device's processor, onboard memory, and various types of data analysis software such as image pattern recognition software.

Other eye calibration methods such as Zhu and Ji, "Eye Gaze Tracking Under Natural Head Movements" Proceedings of the 2005 IEEE Computer Society Conference on Computer Vision and Pattern Recognition (CVPR '05), 1063-6969/05, or alternative methods, may also be used.

In addition to the user interfaces discussed herein, many other different types of visual interfaces may also be used to control the device. One example of such a visual interface is taught by the methods of Kozma et. al., "GaZIR: Gaze-based Zooming Interface for Image Retrieval", ICMI-MLMI 2009, 2-6 Nov 2009, Cambridge, Mass., USA, or other method. The GaZIR interface utilizes a gaze based zooming interface to allow the user to progressively zoom in on targets of interest by continuing to gaze at them. Here for example, the interface controls the speed of appearance of new letters based upon information determined by the user's gaze. Other methods may also be used.

The invention claimed is:

1. A method of controlling a vision-controlled, head-mounted frame device for transmitting and receiving information from a human user with at least one eye, said device having a virtual display and at least one eye position tracking sensor, said method comprising:

displaying a plurality of visual targets on said virtual display, said plurality of visual targets each comprising a visible element embedded within an eye position zone with an area that is equal to or larger than said visible element;

at least three or more of said visual targets disposed in a user interface comprising at least a surface of a virtual solid capable of rotation, at least three or more of said plurality of visual targets disposed across said surface in a regularly recurring order, thus providing a predictable disposition of visual elements and corresponding visual targets;

displaying at least three different visible elements from at least three different visual targets from said user interface on said virtual display, producing displayed virtual solid visual targets;

using said at least one eye position tracking sensor to determine when said at least one eye is on average continuously gazing in a direction that is within the eye position zone of at least one of said plurality of visual targets for a time period exceeding a hovering time interval, signaling when said hovering time interval has been exceeded, and if said gaze remains within the eye position zone of said at least one of said plurality of visual targets, without looking away, for a time period exceeding a keypress time interval, registering that an eye gaze controlled virtual key corresponding to said at least one of said displayed virtual solid visual targets has been pressed by said user; and using said eye gaze controlled virtual key presses to control either transmitting or receiving said information to at least one computerized device outside of said head-mounted frame device.

2. The method of claim 1, wherein said signaling comprises signaling methods selected from the group consisting of changing a visible appearance of said visual target, changing a visible appearance of a different visible portion of said virtual display, creating sounds, or creating inaudible vibrations.

3. The method of claim 1, wherein said virtual solid is invisible, and only the visual targets on said virtual solid are displayed on said virtual display.

4. The method of claim 1, further displaying at least one rotation visual target that is configured so that a keypress on said rotation visual target causes said virtual solid to virtually rotate about a first virtual axis of rotation, thereby suppressing the display of at least one of a previously displayed virtual solid visual targets, and causing at least one new displayed virtual solid visual target to now be displayed on said virtual display.

5. The method of claim 4 wherein said visual targets are disposed in at least one row circling an outer circumference of said virtual solid.

6. The method of claim 5, wherein said visual targets are disposed in more than one row circling an outer circumference of said virtual solid; and further displaying at least one shift virtual solid visual target, configured so that a keypress on said shift virtual solid visual target causes said visual targets from a different row of said virtual solid to become displayed virtual solid visual targets.

7. The method of claim 1, wherein said device has at least a standby mode and an active mode, wherein when said device is in a standby mode, although at least some of said area of said visual display will be sensitive to the gazing direction of said at least one eye, more than 50% of the area of said virtual display will not be sensitive to the gazing direction of said at least one eye, thus enabling said user to more freely gaze at outside objects not displayed on said virtual display.

8. The method of claim 7, wherein when said device is in a standby mode, displaying at least one device active visual target with an eye position zone that has an area of less than 50% of the area of said virtual display; and when said user presses the virtual key corresponding to said device active visual target, changing a state of said device from standby mode to active mode.

9. The method of claim 1, wherein said virtual targets have visible elements and virtual keys corresponding to a plurality of text symbols selected from the group consisting of the ASCII character set, the extended ASCII character sets, and the Unicode character set.

10. The method of claim 1, wherein said at least some of said virtual targets are assigned to a set of functions selected from the group consisting of data recall functions, data storage functions, device control functions, outside device control functions, user defined macros, and user defined functions.

11. The method of claim 1, wherein at least incoming messages are displayed in a portion of said virtual display that is distinct from the portion of said virtual display that is used for said plurality of visual targets.

12. The method of claim 1, wherein said eye position zone is an approximately circular zone with an approximate virtual diameter, as seen from said at least one eye of said human user, of less than or equal to 10 degrees.

13. The method of claim 1, in which said plurality of visual targets comprises seven or more visual targets.

14. The method of claim 1, wherein said device additionally comprises a camera directed to observe the outside environment, and wherein said virtual display additionally displays augmented reality virtual information.

15. The method of claim 1, wherein said eye position tracking sensor is further calibrated to match the characteristics said at least one eye of said user by the steps of:

instructing said user to gaze at a plurality of visible eye calibration targets on said virtual display, said plurality of visible eye calibration targets having known locations on said virtual display, and determining each time when said at least one eye of said user is gazing at each of said plurality of visible eye calibration targets;

for said each time, using said at least one eye position tracking sensor to obtain eye calibration data pertaining to the appearance of said at least one eye during said each time, and recording said eye calibration data in memory;

and using said eye calibration data as a calibration reference to subsequently determine the eye gaze direction of said at least one eye when said at least one eye is gazing at one or more visual targets on said virtual display.

16. The method of claim 1, wherein said frame comprises frame portions that extend over or behind the ears of said human user, and wherein said frame portions are configured to mount and hold said frame in place on said human user's head.

17. The method of claim 1, wherein said eye gaze controlled virtual key is associated with information comprising at least one text symbol, and wherein transmitting said information comprises transmitting said at least one text symbol.

* * * * *